United States Patent [19]

Pyle et al.

[11] 4,088,583

[45] May 9, 1978

[54] COMPOSITION AND METHOD FOR DRILLING HIGH TEMPERATURE RESERVOIRS

[75] Inventors: Delbert E. Pyle, Northridge; David S. Pye, Brea; Paul W. Fischer, Whittier, all of Calif.

[73] Assignee: Union Oil Company of California, Brea, Calif.

[21] Appl. No.: 746,937

[22] Filed: Dec. 2, 1976

[51] Int. Cl.$^2$ .................. C09K 7/02; C09K 7/08
[52] U.S. Cl. .................. 252/8.5 A; 175/69; 252/8.5 C
[58] Field of Search ............ 252/8.5 C, 8.5 A, 8.5 R, 252/8.55 E; 175/69

[56] References Cited

U.S. PATENT DOCUMENTS

| | | | |
|---|---|---|---|
| 3,269,468 | 8/1966 | Phansalkar et al. | 252/8.5 X |
| 3,313,362 | 4/1967 | Schneider | 252/8.5 X |
| 3,486,560 | 12/1969 | Hutchison et al. | 252/8.5 X |
| 3,525,688 | 8/1970 | Swanson | 252/8.5 |
| 3,749,554 | 7/1973 | Fischer et al. | 252/8.55 X |

*Primary Examiner*—Herbert B. Guynn
*Attorney, Agent, or Firm*—Richard C. Hartman; Dean Sandford; Gerald L. Floyd

[57] ABSTRACT

Composition and method for drilling a well into a high temperature subterranean reservoir, such as one containing a geothermal fluid, wherein there is used an aqueous foam drilling fluid containing (1) water, (2) gas, (3) a foaming agent, (4) an erosion and corrosion inhibitor, (5) a water-soluble or water-dispersible carboxyalkyl cellulose ether or polyalkylene oxide polymer which both controls the fluid loss of the foam and toughens it, and, optionally, (6) a bit lubricant and/or (7) an anti-torqueing agent.

19 Claims, No Drawings

COMPOSITION AND METHOD FOR DRILLING HIGH TEMPERATURE RESERVOIRS

BACKGROUND OF THE INVENTION

1. Field of the Invention

This invention relates to an improved foam drilling fluid composition and method of use thereof in drilling high temperature subterranean reservoirs. More particularly, this invention relates to such a composition and method for drilling such reservoirs with reduced damage to the drilling apparatus and to the reservoir itself.

2. Description of the Prior Art

Drilling wells into subterranean reservoirs containing a high temperature fluid presents many problems concerning the choice of a drilling fluid. Conventional aqueous base drilling fluid containing water, clay and various additives is generally used in drilling the first 2 to 4,000 feet of hole through the usually somewhat incompetent strata above the strata containing the high temperature fluid. Casing is cemented in place over this portion of the hole and drilling is continued using any one of a number of drilling fluids. Problems arise at lower depths when the drill bit penetrates those strata of the reservoir containing a high temperature fluid, which strata often lie several thousand feet below the surface. Such strata are sometimes highly porous and permeable. If conventional drilling fluid is used, the weight of the high gravity column of drilling fluid in the well is so great that a considerable amount of the fluid invades the strata. This necessitates use of a large additional volume of fluid and results in partial plugging of the strata by the clay and other solids in the invading fluid. When the well is subsequently completed, this plugging decreases the amount of fluid which can be produced via or injected into the well. If a relatively light-weight drilling fluid, such as air or another gas, is used, a high rate of circulation of the drilling fluid through the system is required to circulate cuttings out of the hole. This high rate of circulation of the drilling fluid together with the fluids produced from the reservoir, result in corrosion and erosion problems. The high velocity gaseous fluids erode the unconsolidated portions of the reservoir to such an extent that hole stability cannot be achieved. In many cases, even the drill pipe is eroded.

One solution to these problems has been to drill strata containing a high temperature fluid with aqueous foam drilling fluid. Use of this light-weight foam drilling fluid comprising a mixture of water, a gas such as air, a foaming agent and an erosion and corrosion inhibitor, results in increased penetration rates, reduced bit wear and reduced reservoir damage due to erosion by the drilling fluid as compared with air. However, these reservoirs have certain characteristics that make them difficult to drill, even with the previously used foam drilling fluids. For example, such reservoirs of heterogeneous permeability often contain strata of such high permeability of low pressure that they are invaded and partially plugged even by a low density foam drilling fluid. It is through these high permeability strata that most of the fluids produced from or injected into the reservoir must pass. Since it is difficult to effect complete removal of the drilling fluid from the strata following the drilling operation, it is known to add a fluid loss control additive to the foam drilling fluid to reduce the amount of drilling fluid penetrating the strata. U.S. patent application Ser. No. 639,652 filed Dec. 12, 1975, now U.S. Pat. No. 4,013,568, by Fischer et al. describes lignite as a fluid loss control additive for a foam drilling fluid.

Since the reservoir being drilled is at a high temperature and the foam drilling fluid is relatively fragile compared to previously used aqueous drilling muds, there is also a need to increase the stability of the foam. This is particularly true under drilling conditions where the formation pressure is greater than the pressure of the column of drilling fluid. Under these conditions, some of the hot formation fluids enter the well and mix with the circulating foam drilling fluid. One approach has been to use a particular foaming agent which forms a foam which is especially stable at high temperatures. U.S. patent application Ser. No. 621,685 filed Oct. 14, 1975, now U.S. Pat. No. 4,036,764 by Fisher et al. discloses sodium lauryl sulfoacetate and similar compounds as such foaming agents. However, need exists for a still more stable foam drilling fluid, e.g., one that can be made using previously used foaming agents.

Accordingly, a principal object of this invention is to provide a lightweight drilling fluid and method of use thereof suitable for drilling a subterranean reservoir containing a high temperature fluid.

Another object of the invention is to provide such a composition having improved stability.

A further object of the invention is to provide such a method and composition wherein the composition has a reduced tendency to invade the reservoir surrounding the well and hence causes reduced reservoir damage.

A still further object of the invention is to provide such a method and composition for drilling geothermal reservoirs containing wet steam having a temperature of 350° F. and above.

Other objects, advantages and features of the invention will become apparent from the following description and appended claims.

SUMMARY OF THE INVENTION

A composition and method for drilling a well into a subterranean reservoir containing a high temperature liquid at a temperature of 350° F. or above comprising circulating through the well during the drilling operation of foam drilling fluid containing an aqueous medium, a gas, a water-soluble foaming agent, an erosion and corrosion inhibitor, a water-soluble or water-dispersible carboxyalkyl cellulose ether or polyalkyleneoxide polymer as a combination fluid loss control additive and foam stabilizer, and, optionally, a bit lubricant and/or an anti-torqueing agent.

DETAILED DESCRIPTION OF THE INVENTION

In the drilling of high temperature fluid-containing strata of subterranean reservoirs of heterogeneous permeability, it is sometimes desired to utilize an aqueous foam drilling fluid whose low density minimizes invasion and contamination of the high permeability strata by the drilling fluid. However, such a foam drilling fluid must have high stability and low fluid loss. The composition of this invention is such a drilling fluid. The high temperature fluid-containing strata may contain aqueous geothermal fluids or hydrocarbons.

The foam drilling fluid of this invention comprises: (1) about 99.5 to 90 volume percent gas, measured at downhole temperature and pressure conditions, and (2) about 0.5 to 10 volume percent of an aqueous dispersion containing (a) about 327 to 347 pounds per barrel of aqueous medium, (b) about 0.25 to 10 pounds per barrel of foaming agent, (c) about 0.0005 to 1 pound per barrel of erosion and corrosion inhibitor, (d) about 0.25 to 3 pounds per barrel of a combination fluid loss control additive and foam stabilizer, (e) optionally, about 0.03 to 1 pound per barrel of bit lubricant and (f) optionally, about 1 to 10 pounds per barrel of anti-torqueing agent. The drilling fluid can be prepared in any one of a number of ways. All ingredients can be combined at the surface in an agitated mixing device such as a foam generator prior to circulation into the well. However, it is generally preferred to inject the gas, aqueous medium and other additives down the well simultaneously to form the foam in situ. In this latter embodiment, the foaming agent and other additives may be mixed into the aqueous medium at the surface to form an aqueous dispersion which is simultaneously injected into the well along with the gas. Alternatively, the foaming agent and other additives can be simultaneously but separately injected along with the gas and aqueous medium. The clay contained in many aqueous drilling muds tends to invade relatively permeable strata and cause plugging problems. Thus, the foam drilling fluid of this invention is clay-free.

The aqueous medium can be either fresh water, a natural brine or a synthetic brine containing water-soluble salts such as alkali metal and alkaline earth metal halides, sulfates, carbonates and the like. Sodium chloride is the salt most frequently occurring in brine and is generally present in the highest concentration. Brine is the preferred aqueous medium when drilling reservoirs containing clays which swell in fresh water and can bind or stick the drill string.

The gas used in the foam drilling fluid can be air, carbon dioxide, natural gas, combustion gases, nitrogen, and the like. The gas may be partially soluble in the drilling fluid but is present largely in a dispersed or entrained form. The amount of gas used is sufficient to provide a drilling fluid having a substantially lower density than commonly used aqueous drilling mud. Thus, the column of foam drilling fluid in the well during drilling operations has less tendency to invade and contaminate the reservoir than would a column of drilling mud.

The foaming agent can be any of a wide variety of known water-soluble or water-dispersible anionic, cationic or nonionic surface active agents. Typical foaming agents are alkyl aryl sulfonates, fatty alcohol sulfates, sulfated and sulfonated amides and amines, sulfated and sulfonated esters and ethers, alkyl sulfonates, quaternary ammonium derivatives, the condensation products of a fatty material with ethylene or propylene oxide, the condensation products of phenolic compounds having lateral aliphatic groups with ethylene oxide, and the like. A specific foaming agent is the sodium salt of olefin sulfonate obtained from an $\eta$-$\alpha$-olefin mixture having the following composition by weight: $C_{15}$ 30 percent; $C_{16}$ 29 percent; $C_{17}$ 28 percent and $C_{18}$ 13 percent. The amount of foaming agent used, together with the combination fluid loss control additive and foam stabilizer, is sufficient to maintain the foam formed sufficiently stable to be circulated through the drill string without appreciable separation so that cuttings and any produced reservoir fluids can be removed from the well while circulating the drilling fluid at an annular velocity that will not erode the wellbore, e.g., approximately less than 600 cubic feet per minute.

For optimum drilling of reservoirs containing high temperature fluids, it is necessary to further modify the above-described drilling fluid. If air or carbon dioxide is the gas used to aerate the drilling mud, the resulting drilling fluid becomes more corrosive to the drill string and other well equipment than drilling mud alone. If the aerating gas used is methane, nitrogen, or some other non-free-oxygen-containing gas, corrosion can still become a problem when drilling into geothermal fluids containing steam which is picked up and circulated along with the drilling fluid. This corrosion can be reduced by introducing into the circulating aerated drilling fluid stream a corrosion inhibitor, such as one that decomposes at downhole temperature and pressure conditions to release ammonia or a vaporous amine. These compounds also form a resinous residue on the metal equipment of the well with which they come in contact and serve as an erosion inhibitor to decrease erosion by the highly abrasive solid cuttings which are entrained and transported out of the well by the drilling fluid. Such inhibitors are described in U.S. Pat. No. 3,749,554 issued July 31, 1973 to Fischer, Maly and Pyle.

Generally the inhibitors are tertiary amines having molecular weights above about 260, and usually above about 300. Organic compounds that have been found particularly useful in the practice of the invention are ammonia or amine salts of a complex tertiary amine containing at least one functional carboxylic acid group.

More preferably, the erosion and corrosion inhibitor used in the practice of the invention is an ammonium or an amine salt of a complex tertiary amine having at least one univalent radical containing a functional carboxylic acid group with an ester, amine or amide linkage, and the tertiary amine can also contain one or more univalent organic radicals, or a bivalent organic radical which forms a ring structure with the tertiary nitrogen. These compounds can be conveniently represented by the following generalized formula:

$$N(R)_n(R_1)_m(R_2)_p$$

wherein
R is a univalent organic radical selected from Column 1 of Table 1;
$R_1$ is a univalent organic radical selected from Column 2 of Table 1;
$R_2$ is a bivalent organic radical selected from Column 3 of Table 1;
$n$ is 1, 2 or 3;
$m$ is 0, 1 or 2;
$p$ is 0 or 1; and
the sum of $n + m + 2p$ equals 3.

Thus, in one preferred embodiment of the invention, the tertiary amine is comprised of a tertiary nitrogen having attached thereto at least one univalent organic radical containing a carboxylic acid functional group selected from Column 1 of Table 1, and the tertiary nitrogen can also have attached thereto one or two univalent radicals selected from Column 2 of Table b 1, or a bivalent radical selected from Column 3 of Table 1, which forms a ring structure with the tertiary nitrogen.

TABLE 1

| Column 1<br>Carboxylic acid<br>radicals | Column 2<br>Univalent<br>radicals | Column 3<br>Bivalent<br>radicals |
|---|---|---|
| —R$_4$OOCR$_3$COOH | —R$_5$COH | 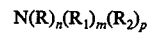 |

TABLE 1-continued

| Column 1<br>Carboxylic acid<br>radicals | Column 2<br>Univalent<br>radicals | Column 3<br>Bivalent<br>radicals |
|---|---|---|
| $-R_4NR_3COOH$<br>$\quad\mid$<br>$\quad R_6$ | $-R_5COOR_6$<br>$-R_5CONH_2$ | $-R_4$<br>$\quad\diagdown$<br>$\qquad O$<br>$\quad\diagup$<br>$-R_4$ |
| $-R_4NHCR_3COOH$<br>$\qquad\parallel$<br>$\qquad O$ | $-R_6$ | $-R_4$<br>$\quad\diagdown$<br>$\qquad N$<br>$\quad\diagup\!\!\diagup$<br>$\quad R_7$ |

In Table 1: $R_3$ represents a bivalent hydrocarbyl radical containing from about 8 to 44 carbon atoms, exemplary of which are bivalent aliphatic hydrocarbon radicals, such as octylene, dodecylene, pentadecylene, octadecylene, eicosylene, tetracosylene, hexacosylene, octacosylene, tricontylene, tetratriacontylene, hexatriacontylene, octatriacontylene, tetracontylene, dotetracontylene, methyl octadecylene, dimethylethyl eicosylene, and the like; bivalent alicyclic hydrocarbon radicals such as the bivalent radicals of cyclohexane, amylcyclobutane, 1,2-diamylcyclobutane, 1,2-dihexylcyclobutane, 1,2-diheptylcyclobutane, 1,3-diarylcyclohexane, 1,3-dihexycyclohexane, and the like; and bivalent aromatic radicals such as 2-phenolethylene, 2,3-diphenoloctylene, paramethylphenol-2-octylene, 1,4-diphenyltetracosylene, bivalent paradiamylbenzene, and the like;

$R_4$ represents an alkylene containing from 1 to 4 carbon atoms, exemplary of which are methylene, ethylene, propylene, methylethylene, butylene, and the like;

$R_5$ represents a bivalent hydrocarbyl radical containing from 1 to 50 carbon atoms, and can include bivalent aliphatic, alicyclic and aromatic radicals, specific examples of which are listed in the above definition of $R_3$;

$R_6$ represents a univalent hydrocarbyl radical containing from 1 to 50 carbon atoms, and can include univalent aliphatic, alicyclic and aromatic radicals; and $R_7$ represents a trivalent aliphatic hydrocarbyl radical containing from 1 to 4 carbon atoms having a univalent terminal carbon and a bivalent terminal carbon.

Preferred univalent organic radicals containing a functional carboxylic acid group are obtained from a hydrocarbon residue and dimerized conjugated hydrocarbons containing between about 8 and 44 carbon atoms. Also preferred are univalent organic radicals obtained from conjugated fatty acids such as linoleic acid, isolinoleic acid, and the like.

The carboxylic acid functional groups in the above-described tertiary amine are neutralized by reaction with ammonia or a water-soluble amine containing from 1 to 15 carbon atoms to form ammonium or amine salts of the tertiary amine. Exemplary of the amines which can be employed are morpholine, substituted morpholines having from 5 to 10 carbon atoms, pyrrolidine, pyridine, and simple primary, secondary and tertiary amines having the following formula:

$$R_8-N\begin{matrix}R_9\\ \\R_{10}\end{matrix}$$

wherein $R_8$, $R_9$ $R_{10}$ are the same or different substituents selected from hydrogen; an alkyl containing about 1 to 4 carbon atoms, exemplary of which are methyl, ethyl, propyl, isopropyl and butyl; and aminoalkyl containing about 2 to 4 carbon atoms, exemplary of which are aminoethyl, aminopropyl, aminoisopropyl and aminobutyl; and an hydroxyalkyl containing from 2 to 4 carbon atoms, exemplary of which are hydroxyethyl, hydroxypropyl, hydroxyisopropyl, and hydroxybutyl.

A preferred class of compounds for use in the practice of the invention are the tri-amine or triammonium salts of an acidic triester of a trialkanol amine, which are generally represented by the following formula:

$$N\begin{matrix}R_4OOCR_3COOH.A\\ -R_4OOCR_3COOH.A\\ R_4OOCR_3COOH.A\end{matrix}$$

wherein $R_3$ and $R_4$ are defined above and A is ammonia or a water-soluble amine containing from 1 to 15 carbon atoms, exemplary of which are the above-described amines. In a particularly preferred embodiment $R_4$ in the above formula is ethylene. While the tri-amine or triammonium salts can be generally described by the above generalized formula, it is recognized that when polydentate water-soluble amines are used to form the salt, cross-linking between two or more of the polyamine molecules may occur. Thus, when these amines are employed, the polyamine compounds may have repeating acidic triester units.

Particularly preferred tri-amine salts are the morpholine, ethylenediamine, N-butylaminoethanol, trimethylamine, dimethylamine, pyridine, triethanolamine, diethylenetriamine, and diethylaminoethanol salts of an acidic triester of triethanolamine, wherein the acidic triester is obtained by esterifying triethanolamine with a long-chain dibasic acid obtained by dimerizing linoleic or isolinoleic acid.

It has been found that various water-soluble or water-dispersible carboxyalkyl cellulose ethers and polyalkyleneoxide polymers act both as a fluid loss control additive and as a foam stabilizer or thickener. Fluid loss control additives reduce the tendency of the foam drilling fluid to invade the strata being drilled. Foam stabilizers or thickeners aid in maintaining the integrity of the foam and make it more resistant to decomposition by hot fluids which are produced from the strata being drilled and contaminate the drilling fluid.

The cellulose derivatives which may be used include various carboxyalkyl cellulose ethers such as sodium carboxyethyl cellulose and sodium carboxymethyl cellulose. Sodium carboxymethyl cellulose is prepared according to well known procedures by treating alkali cellulose with sodium chloroacetate. The sodium carboxymethyl cellulose has a degree of substitution of about 0.4 to 1.4, more commonly 0.7 to 0.8. The degree of substitution is defined as the average number of hydroxyl groups, of the three available in the anhydroglucose unit of the cellulose, that have been substituted. The molecular weight of sodium carboxymethyl cellulose ranges from 21,000 to 500,000. The relatively high molecular weight materials are preferred.

Suitable polyalkyleneoxide polymers include homopolymers or random or block heteropolymers having molecular weights from $10^5$ to $10^8$, preferably from $10^6$ to $10^7$. The polymers can be prepared by the homopolymerization of a single lower alkene oxide, for example ethylene oxide, propylene oxide or butylene oxide or heteropolymerization of more than one alkene oxide. Polyethylene oxide polymers are preferred. Polyox WRS-301, marketed by Union Carbide Chemicals Company, is an example of a polyethylene oxide homopolymer. Pluronic F-127, marketed by the Wyandotte Chemical Company, a condensation product of ethylene oxide and a hydrophobic base formed by the condensation of propylene oxide with propylene glycol, is an example of a heteropolymer.

In the drilling operation, the drilling fluid must provide lubrication for the drill pipe and the drill bit. The drill pipe tends to rub against the sidewall of the well as the drill pipe rotates during drilling. If the drilling fluid is not a good lubricant, the drill pipe can stick and interrupt the drilling operation. Also, in the absence of a lubricating drilling fluid, cuttings tend to build up in the teeth and bearing of the drill bit, thus interfering with the rotation of the drill bit. Non-aerated drilling mud has some lubricating properties. However, with aerated drilling fluid it is preferred to add a bit lubricant.

Suitable lubricants for aerated drilling fluid are water-soluble or water-dispersible hydroxylated fatty esters such as the condensation product of a saturated or unsaturated aliphatic monocarboxylic acid and a low molecular weight alkene oxide. The saturated or unsaturated aliphatic monocarboxylic acids which may be used include fatty acids having about 10 to about 20 carbon atoms. Preferred are lauric, palmitic and oleic acids. Low molecular weight alkene oxides include those having about 2 to about 4 carbon atoms. Ethylene oxide is preferred. The condensation reaction carried out according to well known procedures produces the condensation product

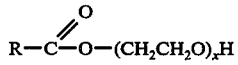

where R is an alkyl group having from 9 to 17 carbon atoms, and $x$ is an integer from 5 to 10.

Optionally, particulated graphite can be added to the aerated drilling fluid to further reduce the coefficient of friction between the drill pipe and the sidewall of the well being drilled, thus decreasing torqueing of the drill pipe. Any form of finely particulated graphite can be employed, such as powder, flake, crystal, rod, plate or fiber.

The invention is further described by the following example which is illustrative of a specific mode of practicing the invention and is not intended as limiting the scope of the invention defined by the appended claims.

EXAMPLE

A well is drilled into strata containing geothermal fluids at a depth of about 5,000 feet to about 8,000 feet. The strata have a temperature of about 500° F. and a pressure of about 3,000 p.s.i.g. The upper portion of the well, from the surface down to a depth of about 4,500 feet, is drilled using liquid aqueous base drilling mud. Drilling is then continued to a depth of 7,500 feet using an aqueous foam drilling fluid wherein there is circulated down the drill string, through the drill bit, back up the annulus between the drill string and the well sidewall, and out of the well: 1,000 cubic feet per minute of air and 3.5 barrels per minute of an aqueous medium comprising: a mixture of 3 pounds per barrel of the condensation product of 1 mole octyl phenol and 10 moles ethylene oxide as a foaming agent; 0.01 pound per barrel erosion and corrosion inhibitor formed by mixing 75 weight percent water, 10 weight percent diethylene triamine and 15 weight percent of an acidic triester prepared by condensation of triethanolamine and dimerized linoleic acid and then diluting with additional water in the proportion of about 30 gallons inhibitor to each 10 barrels of water; 1 pound per barrel of sodium carboxymethyl cellulose as a combination fluid loss control additive and foam stabilizer; 0.1 pound per barrel bit lubricant comprising the condensation product of one mole lauric acid with 15 moles ethylene oxide; 0.1 pound per barrel graphite as an anti-torqueing agent; and remainder water. Drilling is carried out to the desired depth without any difficulty in circulating the drilling fluid. This indicates that the drilling fluid is stable throughout the drilling operation. Following completion of the well, geothermal fluids made up of steam and non-condensible gases are produced from the well at the rate of 150,000 pounds per hour. This high rate of production indicates that there is negligible plugging of the well by the drilling fluid during the drilling operation.

While particular embodiments of the invention have been described, it will be understood, of course, that the invention is not limited thereto since many modifications can be made and it is intended to include within the invention such modifications as are within the scope of the claims.

The invention having thus been described, we claim:

1. An aqueous clay-free foam drilling fluid for drilling a well into strata containing a high temperature fluid comprising about 99.5 to 90 volume percent of a gas and 0.5 to 10 volume percent of an aqueous dispersion containing (a) about 327 to 347 pounds per barrel of aqueous medium, (b) about 0.25 to 10 pounds per barrel of a water-soluble or water-dispersible foaming agent, (c) about 0.0005 to 1 pound per barrel of an organic agent that releases ammonia or a vaporous amine and forms a resinous residue at downhole temperature and pressure conditions comprising a tri-amine or tri-ammonium salt of an acidic triester of a $C_1$ to $C_4$ trialkanol amine as an erosion and corrosion inhibitor, said amine or ammonium salt having been formed by neutralizing said acidic triester with ammonia or a water soluble amine having from 1 to 15 carbon atoms and (d) about 0.25 to 3 pounds per barrel of a water-soluble or water-dispersible polyalkylene oxide polymer wherein the polyalkylene oxide is selected from the group consisting of polyethylene oxide, polypropylene oxide, and polybutylene oxide, said polymer having a molecular weight of from $10^5$ to $10^8$, as a combination fluid loss control additive and foam stabilizer.

2. The composition defined in claim 1 wherein the high temperature fluid contained in the strata is a geothermal fluid.

3. The composition defined in claim 1 wherein the gas is selected from the group consisting of air, carbon dioxide, natural gas, combustion gases and nitrogen.

4. The composition defined in claim 1 wherein the aqueous medium is selected from the group consisting of fresh water, natural brine and synthetic brine.

5. The composition defined in claim 1 wherein the amine or ammonium salt has the formula:

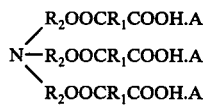

wherein $R_1$ is a bivalent hydrocarbyl radical containing about 8 to 44 carbon atoms, $R_2$ is an alkylene radical containing about 1 to 4 carbon atoms, and A is a water-soluble amine or ammonia.

6. The composition defined in claim 1 including in the aqueous dispersion about 0.03 to 1 pound per barrel of a bit lubricant comprising the condensation product of one mole of a saturated or unsaturated aliphatic monocarboxylic acid having about 8 to 20 carbon atoms with 5 to 20 moles of a lower alkene oxide.

7. The composition defined in claim 1 including in the aqueous dispersion about 1 to about 10 pounds per barrel of graphite.

8. In the method of drilling a well into subterranean strata containing a high temperature fluid wherein an aqueous clay-free foam drilling fluid is passed through the well in contact with the strata during the drilling operation, the improvement which comprises employing as the drilling fluid a composition about 99.5 to 90 volume percent of a gas and 0.5 to 10 volume percent of an aqueous dispersion containing (a) about 327 to 347 pounds per barrel of aqueous medium, (b) about 0.25 to 10 pounds per barrel of a water-soluble or water-dispersible foaming agent, (c) about 0.0005 to 1 pound per barrel of an organic agent that releases ammonia or a vaporous amine and forms a resinous residue at downhole temperature and pressure conditions comprising a tri-amine or tri-ammonium salt of an acidic triester of a $C_1$ to $C_4$ trialkanol amine as an erosion and corrosion inhibitor, said amine or ammonium salt having been formed by neutralizing said acidic triester with ammonia or a water soluble amine having from 1 to 15 carbon atoms (d) about 0.25 to 3 pounds per barrel of a water-soluble or water-dispersible polyalkylene oxide polymer wherein the polyalkylene oxide is selected from the group consisting of polyethylene oxide, polypropylene oxide and polybutylene oxide, said polymer having a molecular weight of from $10^5$ to $10^8$, as a combination fluid loss control additive and foam stabilizer.

9. The method defined in claim 8 wherein the high temperature fluid contained in the strata is a geothermal fluid.

10. The method defined in claim 8 wherein the gas is selected from the group consisting of air, carbon dioxide, natural gas, combustion gases and nitrogen.

11. The method defined in claim 8 wherein the aqueous medium is selected from the group consisting of fresh water, natural brine and synthetic brine.

12. The method defined in claim 8 wherein the amine or ammonium salt has the formula:

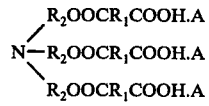

wherein $R_1$ is a bivalent hydrocarbyl radical containing about 8 to 44 carbon atoms, $R_2$ is an alkylene radical containing about 1 to 4 carbon atoms, and A is a water-soluble amine or ammonia.

13. The method defined in claim 8 including in the aqueous dispersion about 0.03 to about 1 pound per barrel of a bit lubricant comprising the condensation product of one mole of a saturated or unsaturated aliphatic monocarboxylic acid having about 8 to 20 carbon atoms with 5 to 20 moles of a lower alkene oxide.

14. The method defined in claim 8 including in the aqueous dispersion about 1 to 10 pounds per barrel graphite.

15. The method defined in claim 8 wherein the drilling fluid is prepared by combining all ingredients of the drilling fluid at the surface in an agitated mixing device prior to circulation into the well.

16. The method defined in claim 8 wherein the drilling fluid is prepared by combining the ingredients of the aqueous dispersion at the surface in an agitated mixing device and injecting the aqueous dispersion and the gas down the well simultaneously.

17. The method defined in claim 8 wherein the drilling fluid is prepared by simultaneously but separately injecting into the well the gas, the aqueous medium, the foaming agent, the erosion and corrosion inhibitor and the combination fluid loss control additive and foam stabilizer.

18. In the method of drilling a well into a subterranean geothermal formation wherein there is passed through the well and in contact with the geothermal formation an aqueous clay-free foam drilling fluid composition comprising about 99.5 to 90 volume percent air and 0.5 to 10 volume percent of an aqueous dispersion containing (a) about 327 to 347 pounds per barrel of an aqueous medium selected from the group consisting of fresh water, natural brine and synthetic brine, (b) about 0.25 to 10 pounds per barrel of a water-soluble or a water-dispersible foaming agent, (c) about 0.0005 to 1 pound per barrel of a tri-amine or tri-ammonium salt having the formula:

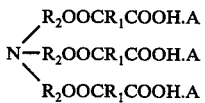

where $R_1$ is a bivalent hydrocarbyl radical containing about 8 to 44 carbon atoms, $R_2$ is an alkylene radical containing about 1 to 4 carbon atoms, and A is a water-soluble amine having from 1 to 15 carbon atoms or ammonia as an erosion and corrosion inhibitor, the improvement which comprises including in the aqueous dispersion about 0.25 to 3 pounds per barrel of a water-soluble or water-dispersible polyethylene oxide polymer having a molecular weight from $10^5$ to $10^8$ as a combination fluid loss control additive and foam stabilizer.

19. The method defined in claim 18 including in the aqueous dispersion about 0.03 to 1 pound per barrel of the condensation product of one mole of a saturated or unsaturated aliphatic monocarboxylic acid having from about 8 to 20 carbon atoms with 5 to 20 moles of ethylene oxide as a bit lubricant.

* * * * *